US011206338B2

(12) United States Patent
Osawa

(10) Patent No.: US 11,206,338 B2
(45) Date of Patent: Dec. 21, 2021

(54) FILE PROCESSING SYSTEM

(71) Applicant: FUJIFILM Business Innovation Corp., Tokyo (JP)

(72) Inventor: Yasushi Osawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 159 days.

(21) Appl. No.: 16/449,453

(22) Filed: Jun. 24, 2019

(65) Prior Publication Data

US 2020/0014818 A1 Jan. 9, 2020

(30) Foreign Application Priority Data

Jul. 3, 2018 (JP) .............................. JP2018-126974

(51) Int. Cl.
*H04N 1/08* (2006.01)
*H04N 1/32* (2006.01)
*H04N 1/00* (2006.01)

(52) U.S. Cl.
CPC ..... *H04N 1/32678* (2013.01); *H04N 1/00177* (2013.01); *H04N 1/00209* (2013.01); *H04N 1/00244* (2013.01); *H04N 1/00307* (2013.01); *H04N 2201/0094* (2013.01)

(58) Field of Classification Search
CPC .......... H04N 1/00244; H04N 1/00307; H04N 2201/0094
See application file for complete search history.

(56) References Cited

U.S. PATENT DOCUMENTS

2002/0041394 A1* 4/2002 Aoki ...................... G06Q 30/06
358/1.15
2016/0021264 A1* 1/2016 Takeuchi ............. H04N 1/4413
358/1.15

FOREIGN PATENT DOCUMENTS

JP 2008117349 5/2008

* cited by examiner

*Primary Examiner* — Ibrahim Siddo
(74) *Attorney, Agent, or Firm* — JCIPRNET

(57) ABSTRACT

A file processing system includes an information processing apparatus, a terminal apparatus that has a process instructing function for directly transmitting a file to be processed to the information processing apparatus and executing a process, by a user, and a server that is connected to the terminal apparatus and the information processing apparatus through a network, in which the terminal apparatus includes a file transmitting unit that transmits a file to the server, in a case where the process instructing function is not capable of being used due to a failure of communication with the information processing apparatuses, and the file processing system further includes a transfer control unit that controls transfer of the file transmitted to the server, to the information processing apparatus, and the information processing apparatus includes a process control unit that controls a process of the file acquired from the terminal apparatus through the server, in a case where the process instructing function is not capable of being used due to the failure of communication with the information processing apparatuses.

11 Claims, 10 Drawing Sheets

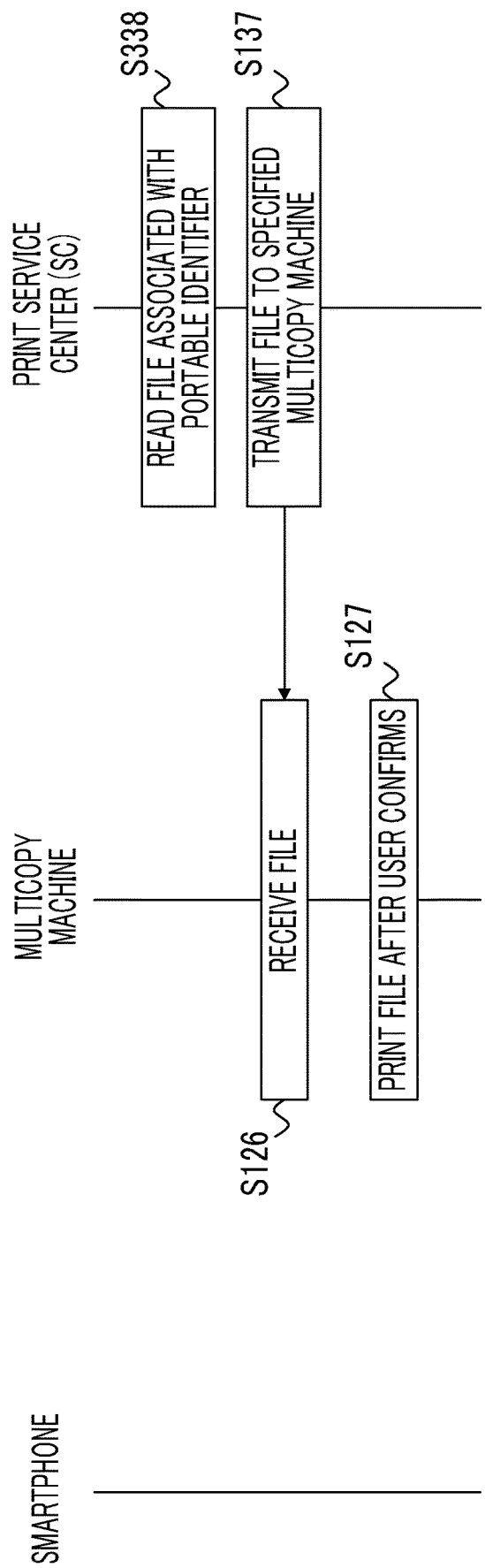

FILE PROCESSING SYSTEM

CROSS-REFERENCE TO RELATED APPLICATIONS

This application is based on and claims priority under 35 USC 119 from Japanese Patent Application No. 2018-126974 filed Jul. 3, 2018.

BACKGROUND

(i) Technical Field

The present invention relates to a file processing system.

(ii) Related Art

In the related art, a user brings a smartphone to a convenience store, directly transmits a file such as a photograph stored in the smartphone to a multicopy machine installed in the convenience store through Wi-Fi (registered trademark) by using multi-copy application, and make the multicopy machine print the file.

JP2008-117349A is an example of the related art.

SUMMARY

Aspects of non-limiting exemplary embodiments of the present disclosure relate to a file processing system in which a file is delivered to an information processing apparatus even in a situation where a terminal apparatus cannot directly transmit the file to the information processing apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a file processing system including an information processing apparatus; a terminal apparatus that has a process instructing function for directly transmitting a file to be processed to the information processing apparatus and executing a process, by a user; and a server that is connected to the terminal apparatus and the information processing apparatus through a network, in which the terminal apparatus includes a file transmitting unit that transmits a file to the server, in a case where the process instructing function is not capable of being used due to a failure of communication with the information processing apparatuses, and the file processing system further includes a transfer control unit that controls transfer of the file transmitted to the server, to the information processing apparatus, and the information processing apparatus includes a process control unit that controls a process of the file acquired from the terminal apparatus through the server, in a case where the process instructing function is not capable of being used due to the failure of communication with the information processing apparatuses.

BRIEF DESCRIPTION OF THE DRAWINGS

Exemplary embodiment(s) of the present invention will be described in detail based on the following figures, wherein:

FIG. 11B is a sequence diagram showing the printing process subsequent to FIG. 11A;

DETAILED DESCRIPTION

Hereinafter, exemplary embodiments of the present invention will be described with reference to the drawings.

Exemplary Embodiment 1

Figure 1:
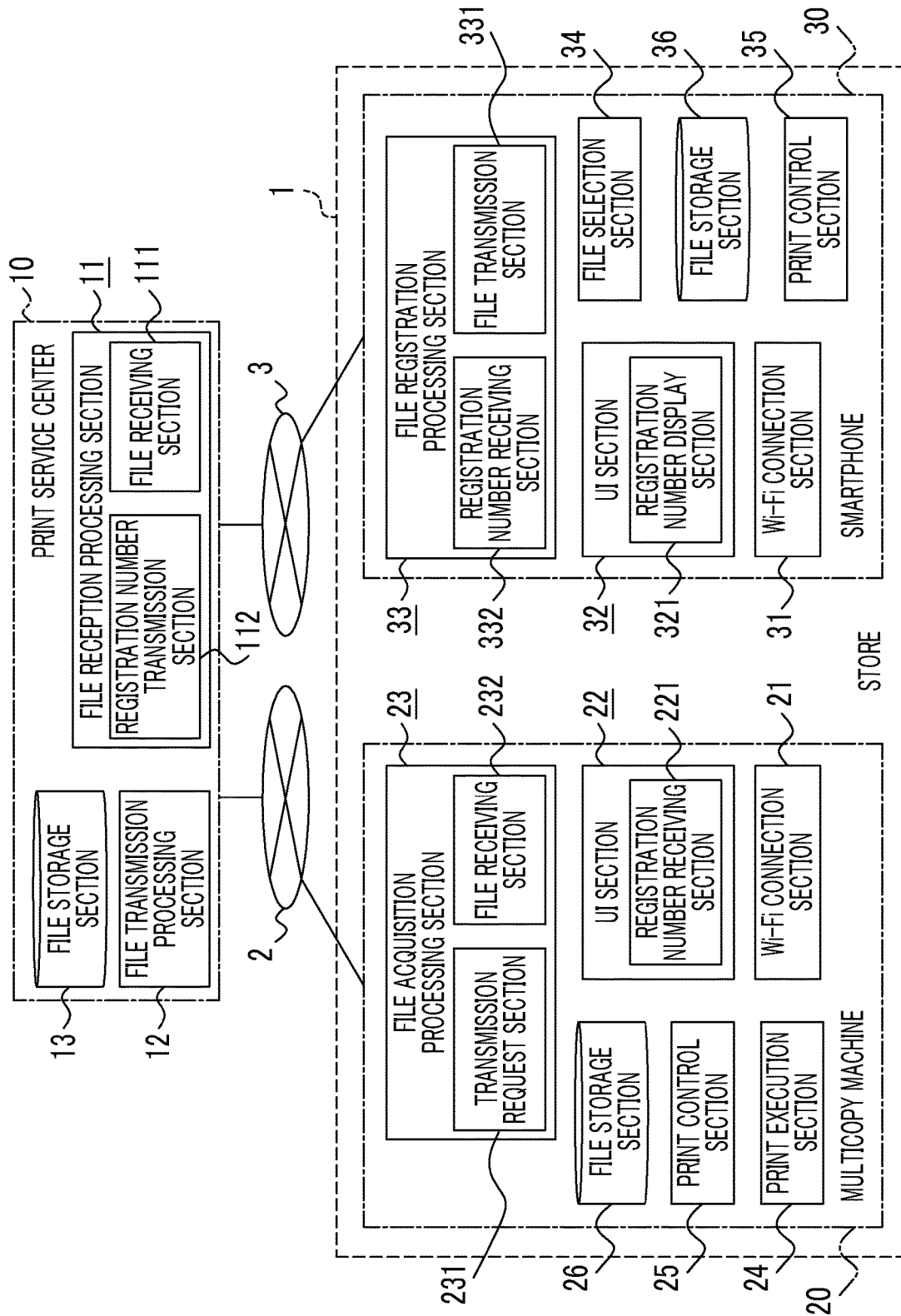
FIG. 1 is a diagram showing an overall configuration of a file processing system and a block configuration of each apparatus in Exemplary Embodiment 1.

FIG. 1 is a diagram showing an overall configuration of a file processing system according to an exemplary embodiment of the present invention and a block configuration of each apparatus. In FIG. 1, for example, a multicopy machine 20 installed in a store 1 such as a convenience store, a smartphone 30 brought to the store 1 by a user, and a print service center 10 are shown. The print service center 10 is connected to the multicopy machine 20 through a network 2 such as the Internet in a wired or wireless manner so as to be able to communicate with the multicopy machine 20 and is wirelessly connected to the smartphone 30 through a communication network 3 of a mobile communication company so as to be able to communicate with the smartphone 30. The multicopy machine 20 and the smartphone 30 can be wirelessly connected through Wi-Fi. In addition, it is possible to perform short-distance wireless communication using, for example, Bluetooth (registered trademark) or the like.

The print service center 10 provides the user of the multicopy machine 20 with a print service capable of printing a file registered through the Internet by the multicopy machine 20. In the print service center 10, an existing general-purpose server computer is installed. The print service provided by the print service center 10 is realized strictly by the operation of a server computer installed in the print service center 10, but in the following description, for convenience, the "print service center 10" is handled synonymously with the server computer installed in the print service center 10.

Figure 2:
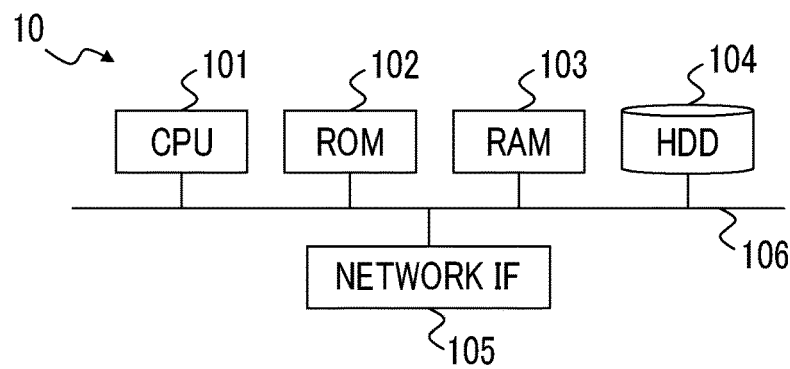
FIG. 2 is a hardware configuration diagram of a server computer constituting a print service center in Exemplary Embodiment 1.

FIG. 2 is a hardware configuration diagram of a server computer constituting the print service center 10 in the present exemplary embodiment. The print service center 10 according to the present exemplary embodiment includes a CPU 101, a ROM 102, a RAM 103, a hard disk drive (HDD) 104 as storage means, and a network interface (IF) 105 provided as communication means for communicating with the multicopy machine 20 and the smartphone 30 through the communication network 3, shown in FIG. 2, which are connected to an internal bus 106. A user interface may be provided as necessary.

As shown in FIG. 1, the print service center 10 includes a file reception processing section 11, a file transmission processing section 12, and a file storage section 13. Components not used in the description of the present exemplary embodiment are omitted from the drawing. The file reception processing section 11 receives the file sent from the smartphone 30 and registers the file in the file storage section 13. A file receiving section 111 in the file reception processing section 11 receives the file sent from the smartphone 30. A registration number transmission section 112 issues a registration number as specific information for specifying the file received by the file receiving section 111 and transmits the registration number to the smartphone 30 which is the file transmission source. The file registered in the file storage section 13 is associated with the issued registration number. In response to a transmission request including a registration number from the multicopy machine 20, the file transmission processing section 12 fetches a file associated with the registration number from the file storage section 13 and transmits the file to the multicopy machine 20 which is the transmission request source.

The file reception processing section 11, the file transmission processing section 12, and the file storage section 13 in the present exemplary embodiment may use processing functions used by the print service center 10 to provide a print service. In the present exemplary embodiment, an image file such as a photograph is assumed, but the type of the file is not limited thereto as long as it is a file of a type that the multicopy machine 20 can print, such as a document file.

Each of the constituent elements 11 and 12 in the print service center 10 is realized by a cooperative operation of a computer forming the print service center 10 and a program operated by the CPU 101 mounted in the computer. Further, the file storage section 13 is realized by the HDD 104 mounted in the print service center 10. Alternatively, the RAM 103 or external storage means may be used through a network.

The multicopy machine 20 is an apparatus that provides users with various copying functions such as copying of documents brought in by the user in the store 1 and printing of files using print services provided by the print service center 10. For example, the multicopy machine 20 can be realized by an image forming apparatus such as a multifunction peripheral which provides plural functions such as a scanner function and a facsimile function in addition to the copy function. In the present exemplary embodiment, a description will be made assuming that only one multicopy machine 20 is installed in the store 1.

Figure 3:
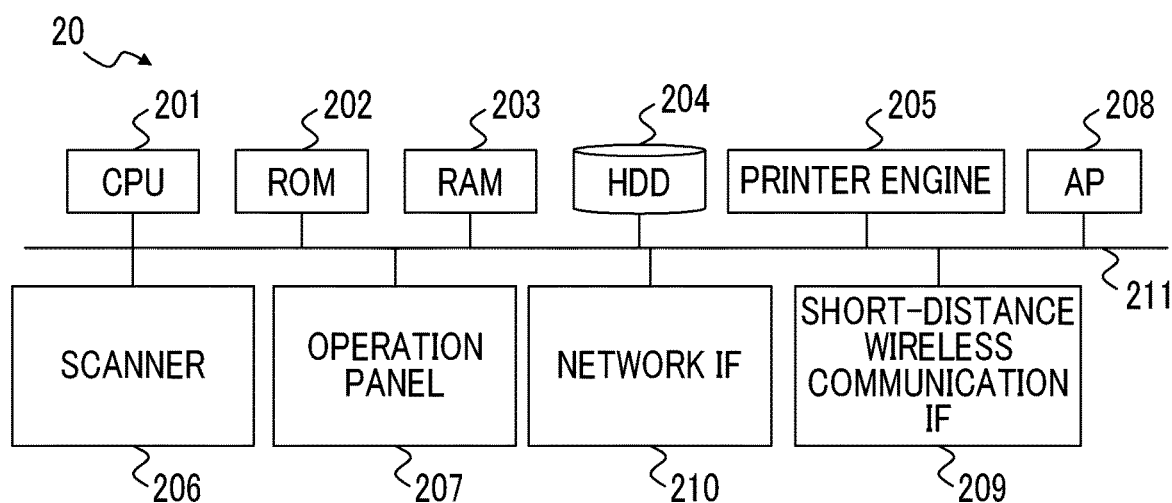
FIG. 3 is a hardware configuration diagram of a multicopy machine in Exemplary Embodiment 1.

FIG. 3 is a hardware configuration diagram of the multicopy machine 20 in the present exemplary embodiment. As described above, the multicopy machine 20 can be realized by a multifunction peripheral equipped with various functions, and is an apparatus incorporating an information processing apparatus (computer). As for the hardware, it is possible to use an existing multicopy machine 20. The multicopy machine 20 according to the present exemplary embodiment is configured to include a CPU 201, a ROM 202, a RAM 203, a hard disk drive (HDD) 204 as storage means, a printer engine 205 that prints an image on an output sheet in accordance with an instruction from a control program executed by the CPU 201, a scanner 206 which reads a document set by the user and accumulates the read document in the HDD 204 or the like as electronic data, and an operation panel 207 as a user interface that receives an instruction from the user and displays information, shown in FIG. 3, which are connected to an internal bus 211. Further, the multicopy machine 20 includes an access point (AP) 208, a short-distance wireless communication interface (IF) 209, and a network interface (IF) 210 for communicating with other apparatuses. The access point 208 is wireless communication means equipped with an access point function, and performs wireless communication with, for example, the smartphone 30 through Wi-Fi Direct (registered trademark). The short-distance wireless communication interface 209 is short-distance wireless communication means for performing short-distance wireless communication with, for example, the smartphone 30 by Bluetooth or the like. The network interface 210 is communication means for communicating with a LAN (not shown) inside the store 1 and external apparatuses through the network 2.

The multicopy machine 20 includes a Wi-Fi connection section 21, a user interface (UI) section 22, a file acquisition processing section 23, a print execution section 24, a print control section 25, and a file storage section 26. Components not used in the description of the present exemplary embodiment are omitted from the drawing. The Wi-Fi connection section 21 is realized by the access point 208, and is wirelessly connected with the smartphone 30 through Wi-Fi. The user interface (UI) section 22 is realized by the operation panel 207, displays various screens, and receives information input by the user from the screen. A registration number receiving section 221 included in the user interface section 22 receives a registration number input from the registration information input screen by the user carrying the smartphone 30.

The file acquisition processing section 23 acquires a file associated with the registration number by transmitting a transmission request including the registration number received by the registration number receiving section 221 to the print service center 10. A transmission requesting section 231 included in the file acquisition processing section 23 transmits the transmission request to the print service center 10, and the file receiving section 232 receives the file transmitted from the print service center 10 in response to the transmission request, and stores the file in the file storage section 26. The print execution section 24 executes printing of the file acquired by the file acquisition processing section 23 according to the user operation in the smartphone 30. The print control section 25 performs process control of the printing function in a case where the user selects the printing function. For example, the print control section 25 controls printing by the print execution section 24.

Each of the constituent elements 21 to 25 in the multicopy machine 20 is realized by a cooperative operation of a computer incorporated in the multicopy machine 20 and a program operated by the CPU 201 mounted in the computer. Further, the file storage section 26 is realized by the HDD 204 mounted on the multicopy machine 20. Alternatively, the RAM 203 or external storage means may be used through a network.

The smartphone 30 is a terminal apparatus (mobile terminal) carried by the user who visits the store 1 and uses the multicopy machine 20. As long as an apparatus has a hardware configuration and a function to be described later, the user may carry other types of terminal apparatuses such as a tablet terminal instead of the smartphone 30.

Figure 4:
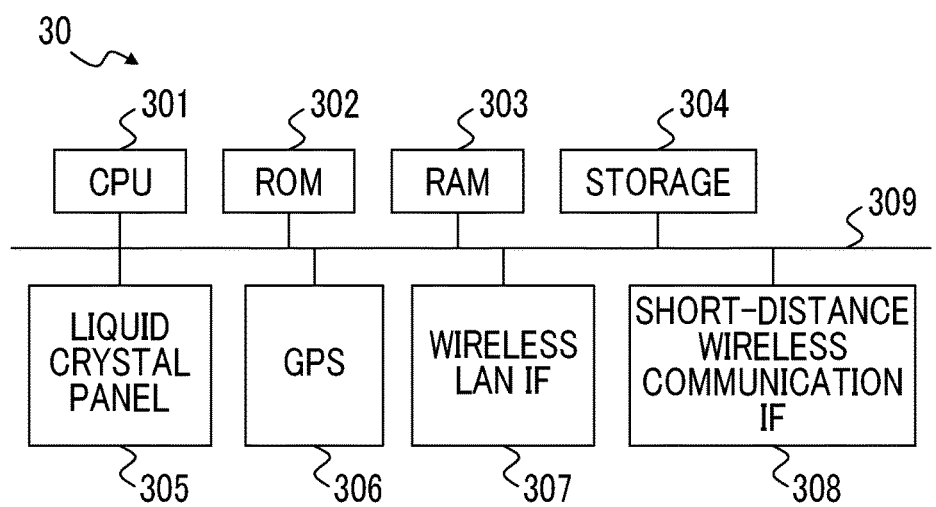
FIG. 4 is a hardware configuration diagram of a computer incorporated in a smartphone in Exemplary Embodiment 1.

FIG. 4 is a hardware configuration diagram of a computer incorporated in the smartphone 30 in the present exemplary embodiment. The smartphone 30 in the present exemplary embodiment is configured to include a CPU 301, a ROM 302, a RAM 303, a storage 304 as storage means, a liquid crystal panel 305 as a user interface for receiving an instruction from the user and displaying information, and a GPS 306 as positioning means, shown in FIG. 4, which are connected to an internal bus 309. Furthermore, the smartphone 30 includes a wireless LAN interface (IF) 307 and a short-distance wireless communication interface (IF) 308 for communicating with other apparatuses. The wireless LAN interface 307 performs wireless communication with, for example, the access point 208 in the multicopy machine 20 through Wi-Fi Direct. The short-distance wireless communication interface 308 is short-distance wireless communication means for performing short-distance wireless communication with, for example, the multicopy machine 20 by Bluetooth or the like.

The smartphone 30 includes a Wi-Fi connection section 31, a user interface (UI) section 32, a file registration processing section 33, a file selection section 34, a print control section 35, and a file storage section 36. Components not used in the description of the present exemplary embodiment are omitted from the drawing. The Wi-Fi connection section 31 is wirelessly connected to the access point 208 in the multicopy machine 20 by Wi-Fi. The user interface (UI) section 22 is realized by the liquid crystal panel 305, displays various screens, and receives information input by the user from the screen. The registration number display section 321 included in the user interface section 22 displays the registration number sent from the print service center 10 on a predetermined registration information display screen.

Files to be printed are stored in the file storage section 36, and the file selection section 34 makes the user select a file from among the files to be printed. The file selected by the user is printed by the multicopy machine 20 by the print instructing function. The print instructing function is a function of directly transmitting the file selected by the user to the multicopy machine 20 through Wi-Fi and causing the multicopy machine 20 to execute printing. In a case where the print instructing function is not capable of being used due to the occurrence of a Wi-Fi connection error with the multicopy machine 20, the file registration processing section 33 transmits the file and registers the file in the print service center 10. The file transmission section 331 in the file registration processing section 33 transmits the file to be registered to the print service center 10. The registration number receiving section 332 receives the registration number transmitted from the print service center 10 after the registration of a file. The print control section 35 performs process control of the print instructing function executed by selecting the multi-copy application installed in the smartphone 30.

Each of the constituent elements 31 to 35 in the smartphone 30 is realized by a cooperative operation of a computer incorporated in the smartphone 30 and a program operated by the CPU 301 mounted in the computer. Further, the file storage section 36 is realized by the storage 304 mounted in the smartphone 30. Alternatively, the RAM 303 or external storage means may be used through a network.

The programs used in the present exemplary embodiment described above can be provided not only by communication means but also by being stored in a computer readable recording medium such as a USB memory. The programs provided by the communication means or by the recording medium are installed in a predetermined computer of the print service center 10, the multicopy machine 20 or the smartphone 30, and various processes are realized by the CPU of the computer sequentially executing the programs.

Next, the operation in the present exemplary embodiment will be described.

Figure 5:
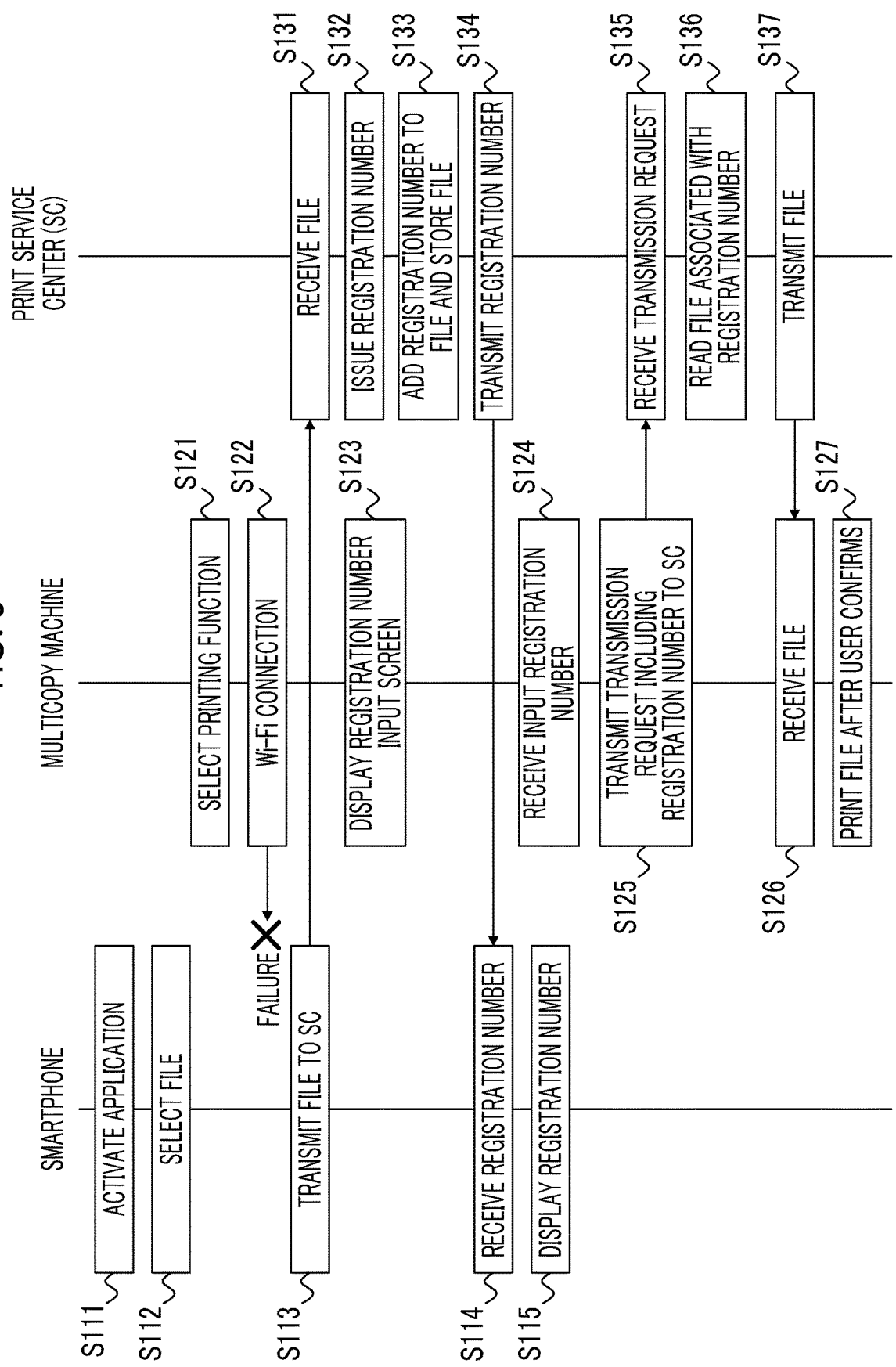
FIG. 5 is a sequence diagram showing a printing process in Exemplary Embodiment 1.

In order to print the file stored in the smartphone 30 using the multicopy machine 20 of the store 1, the user stops by the store 1. Then, by activating the multi-copy application already installed in the smartphone 30, the user starts the printing process of the file in the present exemplary embodiment. Hereinafter, the printing process according to the present exemplary embodiment will be described with reference to a sequence diagram shown in FIG. 5.

As described above, the printing process according to the present exemplary embodiment is started by the user activating the multi-copy application installed in the smartphone 30 (step S111). Along with this, the print control section 35 is activated and starts operation control to operate other constituent elements. First, the user interface section 32 displays a file selection screen (not shown) on the liquid crystal panel 305. In a case where the user selects a file from the file selection screen, the file selection section 34 receives identification information of the selected file, for example, a file name (step S112). In addition, the processing in the smartphone 30 can be strictly executed even outside the store 1.

Subsequently, in a case where the user operates the operation panel 207 in the multicopy machine 20 to select a printing function, the print control section 25 is activated and starts the operation control to operate the other constituent elements (step S121). First, the Wi-Fi connection section 21 performs Wi-Fi connection with the smartphone 30 (step S122).

Here, in a case where the Wi-Fi connection is performed normally, the print control section 35 transmits the selected file to the multicopy machine 20 through Wi-Fi. In the multicopy machine 20, in a case where the file transmitted from the smartphone 30 is stored in the file storage section 26, the print control section 25 displays a list of file names of the stored files on the operation panel 207, allows the user to confirm a file to be printed, and then, causes the print execution section 24 to print the file.

As described above, in a case where the Wi-Fi connection is performed normally, the file to be printed is directly transmitted from the smartphone 30 to the multicopy machine 20 through Wi-Fi and printed. However, in a case where the Wi-Fi connection has not been performed normally, in the present exemplary embodiment, the operation will be performed as follows.

First, although the print control section 35 in the smartphone 30 searches for the access point 208 in the multicopy machine 20, in a case where it is detected that the Wi-Fi connection with the multicopy machine 20 has not been performed normally due to timeout or the like, for example, the connection destination of the network is switched to the communication network 3 different from the communication network that can directly communicate with the multicopy machine 20. Then, the file registration processing section 33 transmits the file selected as a print target to the print service center 10 through the communication network 3 (step S113).

In a case of receiving the file transmitted from the smartphone 30 (step S131), the file reception processing section 11 in the print service center 10 newly issues a registration number for specifying the file (step S132). Then, the newly issued registration number is added to the received file, and the file is stored in the file storage section 13 (step S133). Then, the file reception processing section 11 transmits the registration number to the smartphone 30 of the file transmission source (step S134).

Figure 6:
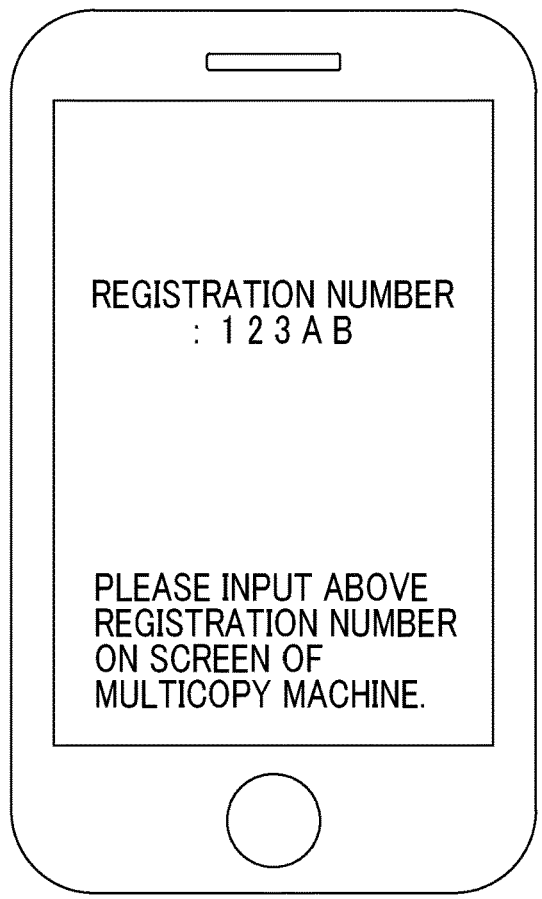
FIG. 6 is a diagram showing a display example of a registration number display screen in Exemplary Embodiment 1.

In a case where the file registration processing section 33 in the smartphone 30 receives the registration number transmitted from the print service center 10 after the transmission of a file (step S114), the print control section 35 instructs the user interface section 32 to display the registration number display screen on the liquid crystal panel 305 (step S115). FIG. 6 shows a display example of the registration number display screen displayed on the liquid crystal panel 305.

Figure 7:
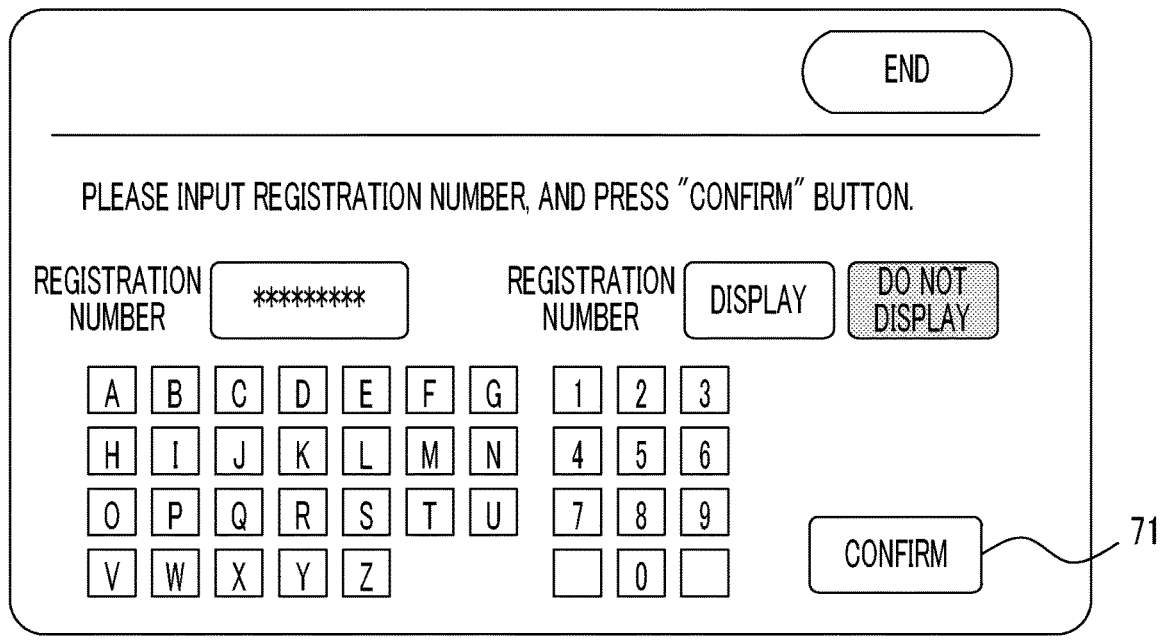
FIG. 7 is a diagram showing a display example of a registration number input screen in Exemplary Embodiment 1.

Incidentally, in a case of recognizing that the Wi-Fi connection with the smartphone 30 has not been performed normally due to occurrence of a communication connection error or the like, the print control section 25 in the multicopy machine 20 instructs the user interface section 22 to display the registration number input screen on the operation panel 207 (step S123). FIG. 7 shows a display example of the registration number input screen displayed on the operation panel 207.

As described above, in the present exemplary embodiment, in a case where the Wi-Fi connection between the multicopy machine 20 and the smartphone 30 has not been performed normally, the printing process is not ended as an error, and the smartphone 30 transmits the file to the print service center 10, and acquires the registration number from the print service center 10. On the other hand, the multicopy machine 20 displays the registration number input screen and waits for the input of the registration number by the user.

Here, in a case where the user inputs the registration number displayed on the registration number display screen of the smartphone 30 from the registration number input screen of the multicopy machine 20 and selects the confirm button 71, the user interface section 22 receives the input registration number (step S124). Then, the print control section 25 causes the file acquisition processing section 23 to transmit a transmission request including the received registration number to the print service center 10 (step S125).

In a case where the print service center 10 receives a transmission request transmitted from the multicopy machine 20 (step S135), the file transmission processing section 12 reads the file associated with the registration number included in the transmission request from the file storage section 13 (step S136), and transmits the file to the multicopy machine 20 which is the transmission request source (step S137).

In a case of receiving the file transmitted from the print service center 10 in response to the transmission request (step S126), the file acquisition processing section 23 in the multicopy machine 20 stores the file in the file storage section 26. Subsequently, the print control section 25 instructs the user interface section 22 to display the file name of the received file on the operation panel 207. In this way, after making the user confirm the file to be printed, the print control section 25 causes the print execution section 24 to print the file (step S127).

As described above, in the present exemplary embodiment, the file transfer control is performed by the file acquisition processing section 23 in the multicopy machine 20 by using the registration number issued by the print service center 10, even in a case where the file is not capable of being directly transmitted from the smartphone 30 to the multicopy machine 20, it is possible to transfer the file in the smartphone 30 (using an alternative file transfer communication network) to the multicopy machine 20 through the print service center 10. Further, by requesting the user to input the registration number, it is possible to confirm that the user is near the installation place of the multicopy machine 20.

Although the user is requested to input the registration number, the user does not need to perform an operation for transferring the file to the multicopy machine 20 in accordance with the Wi-Fi connection error, for example, operations such as causing the multicopy machine 20 to perform printing, by using the print service provided by the print service center 10.

Exemplary Embodiment 2

Figure 8:
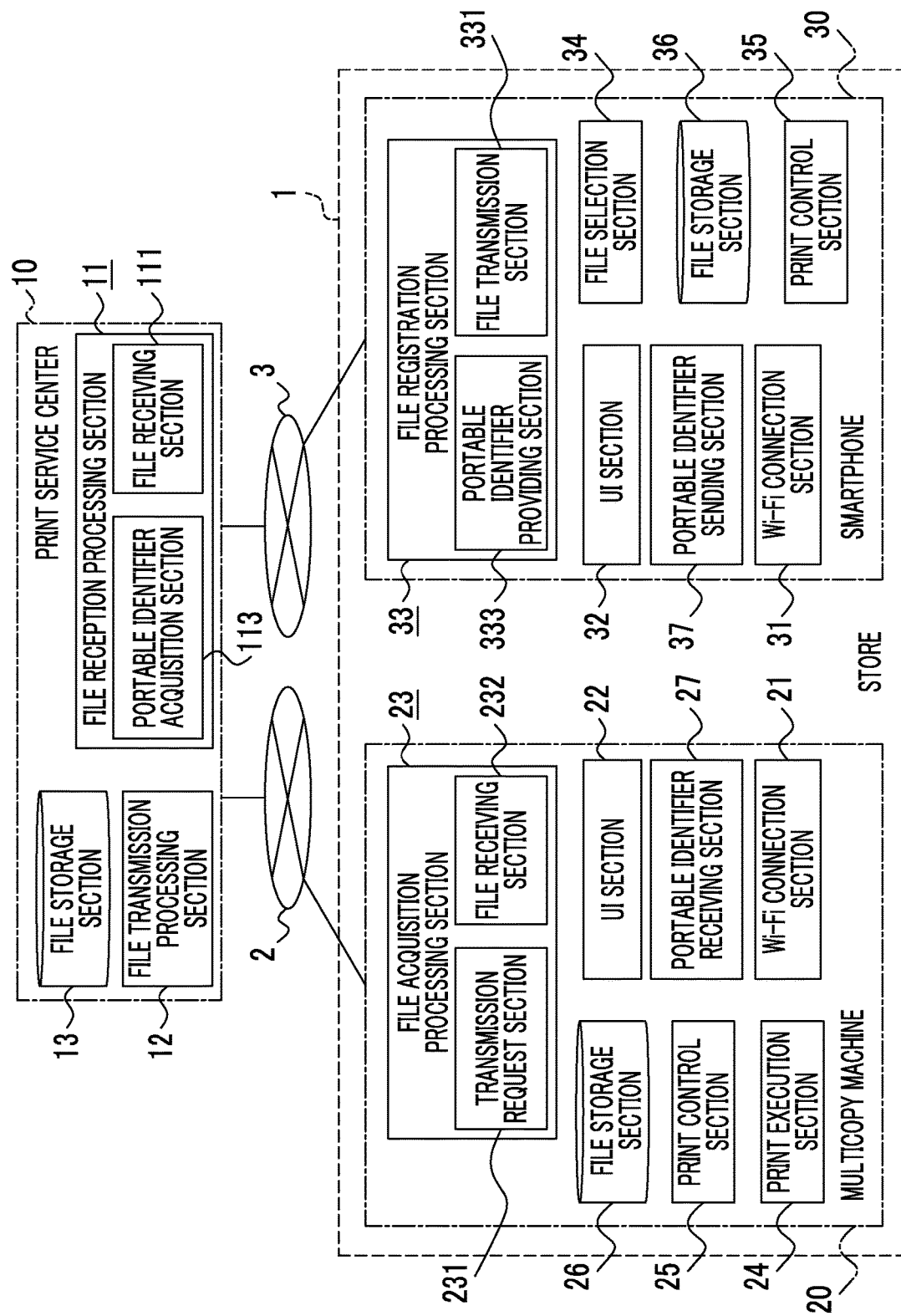
FIG. 8 is a diagram showing an overall configuration of a file processing system and a block configuration of each apparatus in Exemplary Embodiment 2.

FIG. 8 is a diagram showing an overall configuration of a file processing system and a block configuration of each apparatus in the present exemplary embodiment, and corresponds to FIG. 1 in Exemplary Embodiment 1. The identical reference numerals are given to the identical constituent elements as those in Exemplary Embodiment 1, and the description thereof will be omitted as appropriate. The hardware configuration of each of the apparatuses 10, 20, and 30 may be identical to the configuration in Exemplary Embodiment 1.

As shown in FIG. 8, the print service center 10 may be basically identical to Exemplary Embodiment 1, but includes a portable identifier acquisition section 113, instead of the registration number transmission section 112 included in the file reception processing section 11 of Exemplary Embodiment 1. In a case where the file receiving section 111 receives the file, the portable identifier acquisition section 113 requests the smartphone 30 which is the file transmission source to transmit the portable identifier, and acquires the portable identifier sent in response to the request. The portable identifier is apparatus identification information of the smartphone 30 that uniquely specifies the smartphone 30, and in the present exemplary embodiment, the portable identifier is used as specific information for specifying a file received from the smartphone 30.

As shown in FIG. 8, the multicopy machine 20 has a configuration in which a portable identifier receiving section 27 is added to the configuration of Exemplary Embodiment 1. In the present exemplary embodiment, since the registration number is not used, the registration number receiving section 221 is not required in the user interface section 22. The portable identifier receiving section 27 acquires the portable identifier of the smartphone 30 from the smartphone 30. The portable identifier receiving section 27 according to the present exemplary embodiment receives a portable identifier by performing short-distance wireless communication with the smartphone 30 by Bluetooth or the like in cooperation with the short-distance wireless communication interface 209.

The smartphone 30 has a configuration in which a portable identifier sending section 37 is added to the configuration of Exemplary Embodiment 1. In the present exemplary embodiment, since the registration number is not used, the registration number display section 321 is not required in the user interface section 32. A portable identifier providing section 333 is provided instead of the registration number receiving section 332 included in the file registration processing section 33. The portable identifier providing section 333 transmits the portable identifier of the smartphone 30 in response to a request from the print service center 10.

Figure 9:
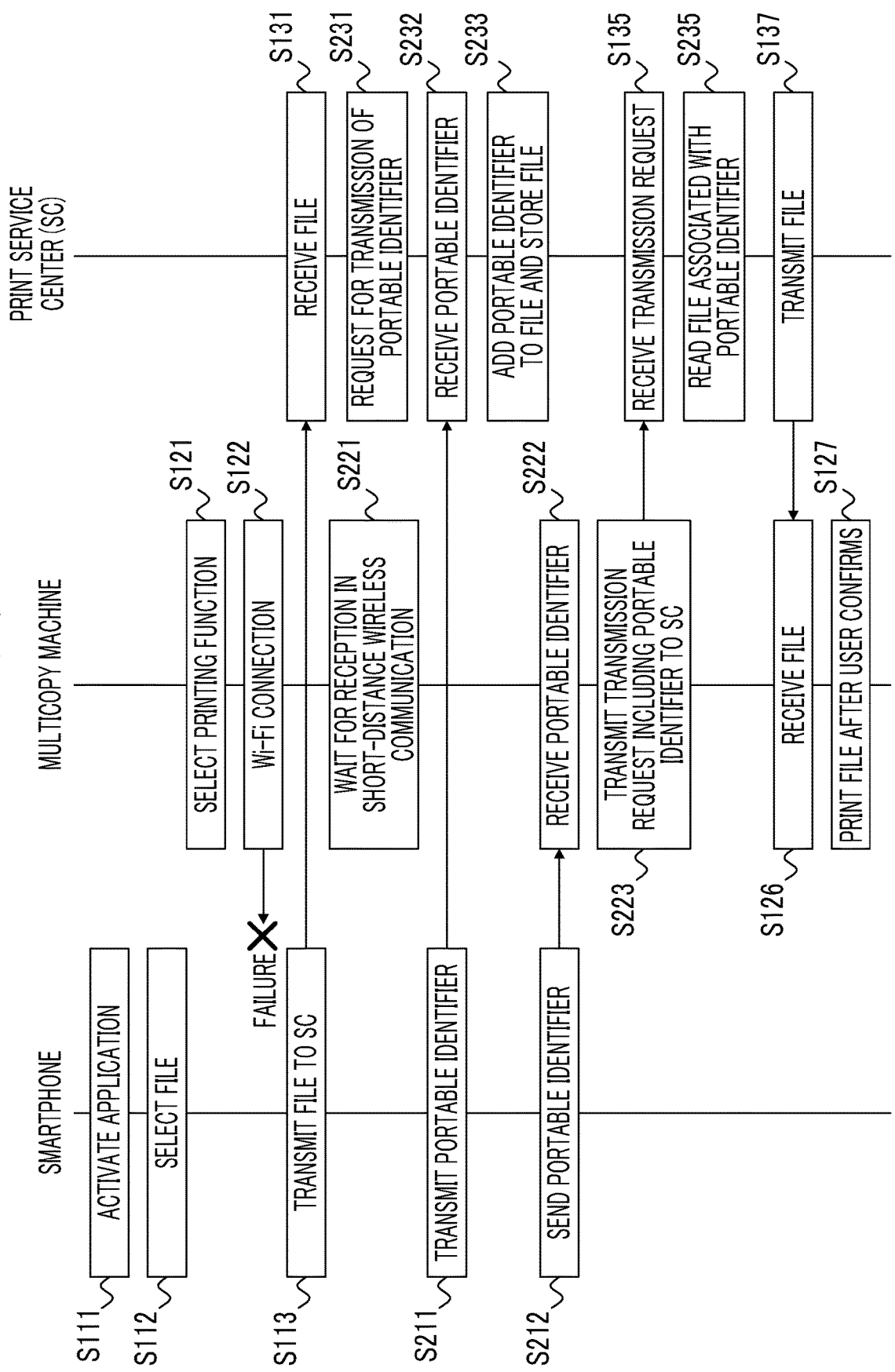
FIG. 9 is a sequence diagram showing a printing process in Exemplary Embodiment 2.

Next, the printing process according to the present exemplary embodiment will be described with reference to a sequence diagram shown in FIG. 9. The sequence diagram shown in FIG. 9 corresponds to FIG. 5 in Exemplary Embodiment 1, but the identical step numbers are assigned to the processes identical to the processes in Exemplary Embodiment 1, and the description is omitted as appropriate.

The user activates the multi-copy application installed in the smartphone 30 (step S111), selects a file (step S112), and then, selects the printing function in the multicopy machine 20 (step S121), but it is assumed that the Wi-Fi connection has failed (step S122).

With the failure of the Wi-Fi connection, the file registration processing section 33 in the smartphone 30 transmits the file to the print service center 10 (step S113).

In a case where the file reception processing section 11 in the print service center 10 receives the file transmitted from the smartphone 30 (step S131), the portable identifier acquisition section 113 requests the smartphone 30 which is the file transmission source to transmit the portable identifier (step S231).

In response to a request from the print service center 10, the portable identifier providing section 333 in the smartphone 30 transmits the portable identifier of the smartphone 30 (step S211).

In a case where the portable identifier acquisition section 113 in the print service center 10 receives the portable identifier (step S232), the file reception processing section 11 adds the acquired portable identifier to the received file, and stores the file in the file storage section 13 (step S233).

Incidentally, in a case of recognizing that the Wi-Fi connection with the smartphone 30 has not been performed normally, the print control section 25 in the multicopy machine 20 activates the portable identifier receiving section 27 to make the multicopy machine 20 wait for the reception of data (step S221). On the other hand, in a case of causing the portable identifier providing section 333 to transmit the portable identifier, the print control section 35 in the smartphone 30 causes the portable identifier sending section 37 to send the portable identifier (step S212). Thus, the portable identifier receiving section 27 receives the portable identifier sent by a portable identifier sending section 37 in the smartphone 30 (step S222).

In order for the portable identifier receiving section 27 to receive the portable identifier sent by the portable identifier sending section 37, the user carrying the smartphone 30 needs to approach the multicopy machine 20 so as to perform short-distance wireless communication between the portable identifier receiving section 27 and the portable identifier sending section 37. In other words, the fact that short-distance wireless communication can be performed between the portable identifier receiving section 27 and the portable identifier sending section 37 means that the user can be confirmed to be near the multicopy machine 20.

In a case where the portable identifier receiving section 27 receives the portable identifier sent by the portable identifier sending section 37, the print control section 25 causes the file acquisition processing section 23 to transmit a transmission request including the received portable identifier to the print service center 10 (step S223).

In a case where the print service center 10 receives a transmission request transmitted from the multicopy machine 20 (step S135), the file transmission processing section 12 reads the file associated with the portable identifier included in the transmission request from the file storage section 13 (step S235), and transmits the file to the multicopy machine 20 which is the transmission request source (step S137).

Since the process executed after the multicopy machine 20 receives the file from the print service center 10 is identical to the process in Exemplary Embodiment 1, the description thereof will be omitted.

The print service center 10 issues the registration number as the specific information for specifying a file in Exemplary Embodiment 1, but in the present exemplary embodiment, the apparatus identification information (portable identifier) of the smartphone 30 is used, so the print service center 10 needs not to issue a registration number. Further, there is no need to cause the user to input the registration number from the operation panel 207 in the multicopy machine 20.

Exemplary Embodiment 3

Figure 10:
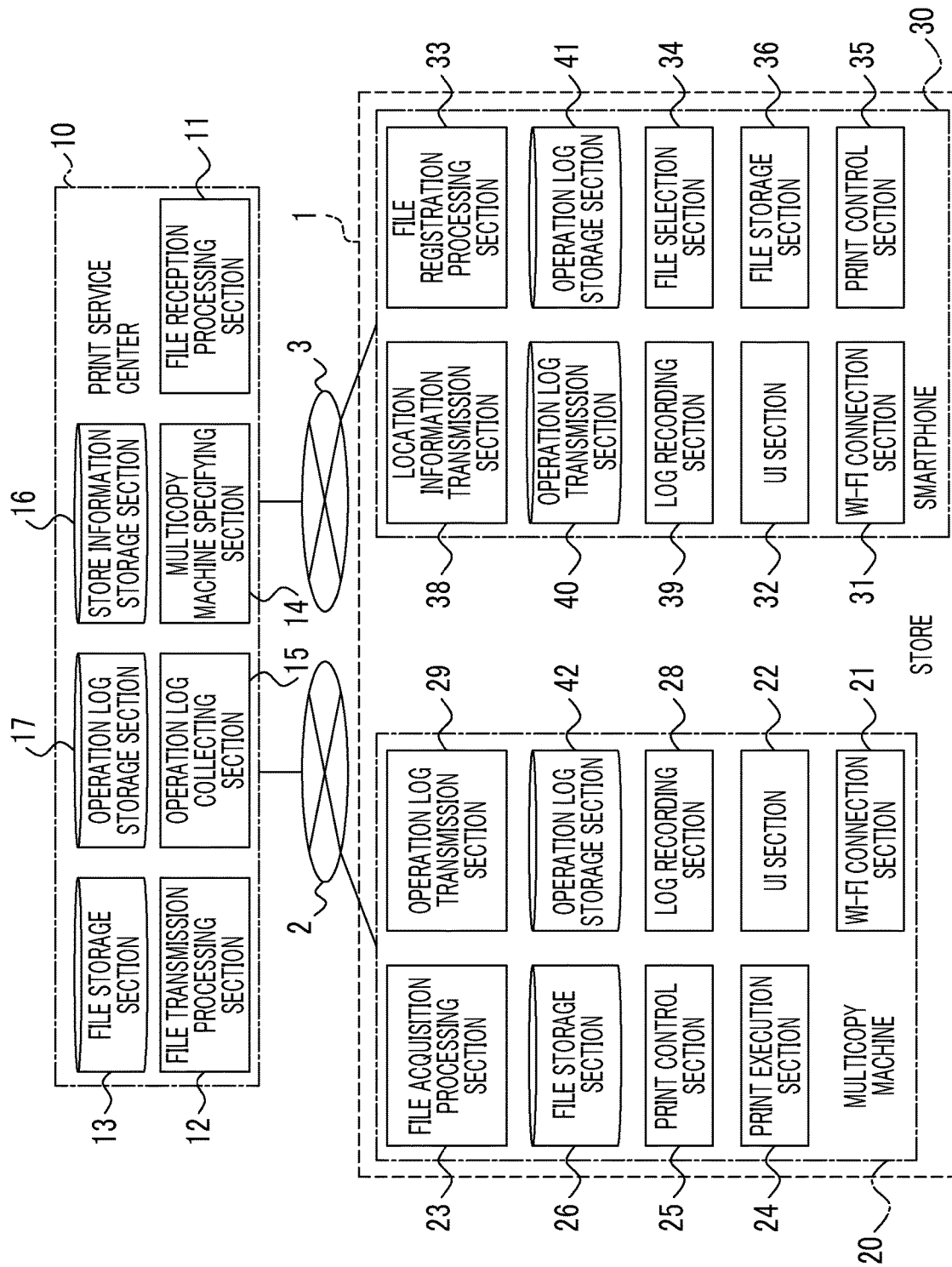
FIG. 10 is a diagram showing an overall configuration of a file processing system and a block configuration of each apparatus in Exemplary Embodiment 3.

FIG. 10 is a diagram showing an overall configuration of a file processing system and a block configuration of each apparatus in the present exemplary embodiment, and corresponds to FIG. 1 in Exemplary Embodiment 1. The identical reference numerals are given to the identical constituent elements as those in Exemplary Embodiment 1, and the description thereof will be omitted as appropriate. The hardware configuration of each of the apparatuses 10, 20, and 30 may be identical to the configuration in Exemplary Embodiment 1.

It is assumed that one multicopy machine 20 is installed in the store 1 in Exemplary Embodiment 1, but in the present exemplary embodiment, it is possible to cope with the case where plural multicopy machines 20 are installed. Plural multicopy machines 20 may be installed in one store 1 or may be installed in plural stores 1.

The print service center 10 has a configuration in which a multicopy machine specifying section 14, an operation log collecting section 15, a store information storage section 16, and an operation log storage section 17 are added in Exemplary Embodiment 1. In the store information storage section 16, store information relating to each store 1 is preset. The store information includes at least the multicopy machine 20 installed in each store 1 and the position information indicating the location of each store 1. The installation position of the multicopy machine 20 is identical to the position of the store 1. As will be described later, since the position information is compared with the location information specifying the position of the smartphone 30, it is desired to represent the position information in the data format identical to the location information. In the present exemplary embodiment, since the location information is indicated by information obtained from the GPS, that is, longitude/latitude information, the position information of the store 1 is also generated with the longitude/latitude information accordingly.

In a case where a file is received from the smartphone 30, the multicopy machine specifying section 14 acquires the location information of the smartphone 30. Further, the multicopy machine specifying section 14 acquires the position information of each store 1. As described above, since the position information of each store 1 is stored in the store information storage section 16, the multicopy machine specifying section 14 refers to the store information storage section 16 to acquire the position information of each store 1. In a case where GPS is mounted in the multicopy machine 20, the position information may be acquired from each multicopy machine 20. The multicopy machine specifying section 14 functions as a specifying unit, and compares the location information of the smartphone 30 with the position information of each multicopy machine 20 and analyzes the collected operation log to specify a multicopy machine 20 that the smartphone 30 (user) has designated as the print processing destination, from among the plural multicopy machines 20. The operation log collecting section 15 collects operation logs from the smartphone 30 and the respective multicopy machines 20 and stores the operation logs in the operation log storage section 17.

Further, the file transmission processing section 12 in the present exemplary embodiment functions as a transfer control unit, and transmits the file transmitted from the smartphone 30 and registered, to the specified multicopy machine 20.

In the present exemplary embodiment, since the registration number is not handled, the file reception processing section 11 may not need to have the function provided by the registration number transmission section 112.

The multicopy machine specifying section 14 and the operation log collecting section 15 are realized by a cooperative operation of a computer forming the print service center 10 and a program operated by the CPU 101 mounted in the computer. The store information storage section 16 and the operation log storage section 17 are realized by the HDD 104 mounted in the print service center 10. Alternatively, the RAM 103 or external storage means may be used through a network.

The multicopy machine 20 has a configuration in which a log recording section 28, an operation log transmission section 29, and an operation log storage section 42 are added to the configuration of Exemplary Embodiment 1. In the case where the multicopy machine 20 is designated as the instruction destination of the print instructing function by the smartphone 30, the log recording section 28 records the operation log related to the user operation related to the processing execution function cooperating with the print instructing function, that is, the printing function selected by the user operating the operation panel 207 in the operation log storage section 42. The operation log transmission section 29 transmits an operation log in response to a request from the print service center 10.

In the present exemplary embodiment, since the registration number is not handled, the function provided by the registration number receiving section 221 of the user interface section 22 is not required. Further, since the file is transmitted under the transfer control by the print service center 10, the function provided by the transmission requesting section 231 of the file acquisition processing section 23 is not required.

The log recording section 28 and the operation log transmission section 29 are realized by a cooperative operation of a computer incorporated in the multicopy machine 20 and a program operated by the CPU 201 mounted in the computer. The operation log storage section 42 is realized by the HDD 204 mounted on the multicopy machine 20. Alternatively, the RAM 203 or external storage means may be used through a network.

In the present exemplary embodiment, it is assumed that plural multicopy machines 20 are installed in one or plural stores 1, but each multicopy machine 20 may have the constituent elements shown in FIG. 10.

The smartphone 30 has a configuration in which a location information transmission section 38, a log recording section 39, an operation log transmission section 40, and an operation log storage section 41 are added to the configuration of Exemplary Embodiment 1. The location information transmission section 38 transmits the location information in response to a request from the print service center 10. The log recording section 39 records the operation log related to the user operation related to the print instructing function in the operation log storage section 41. The operation log transmission section 40 transmits an operation log in response to a request from the print service center 10.

In the present exemplary embodiment, since the registration number is not handled, there may be no functions provided by the registration number display section 321 of the user interface section 32 and the registration number receiving section 332 of the file registration processing section 33.

The location information transmission section 38, the log recording section 39, and the operation log transmission section 40 in the smartphone 30 are realized by a cooperative operation of a computer incorporated in the smartphone 30 and a program operated by the CPU 301 mounted in the computer. Further, the operation log storage section 41 is realized by the storage 304 mounted in the smartphone 30. Alternatively, the RAM 303 or external storage means may be used through a network.

Figure 11A:
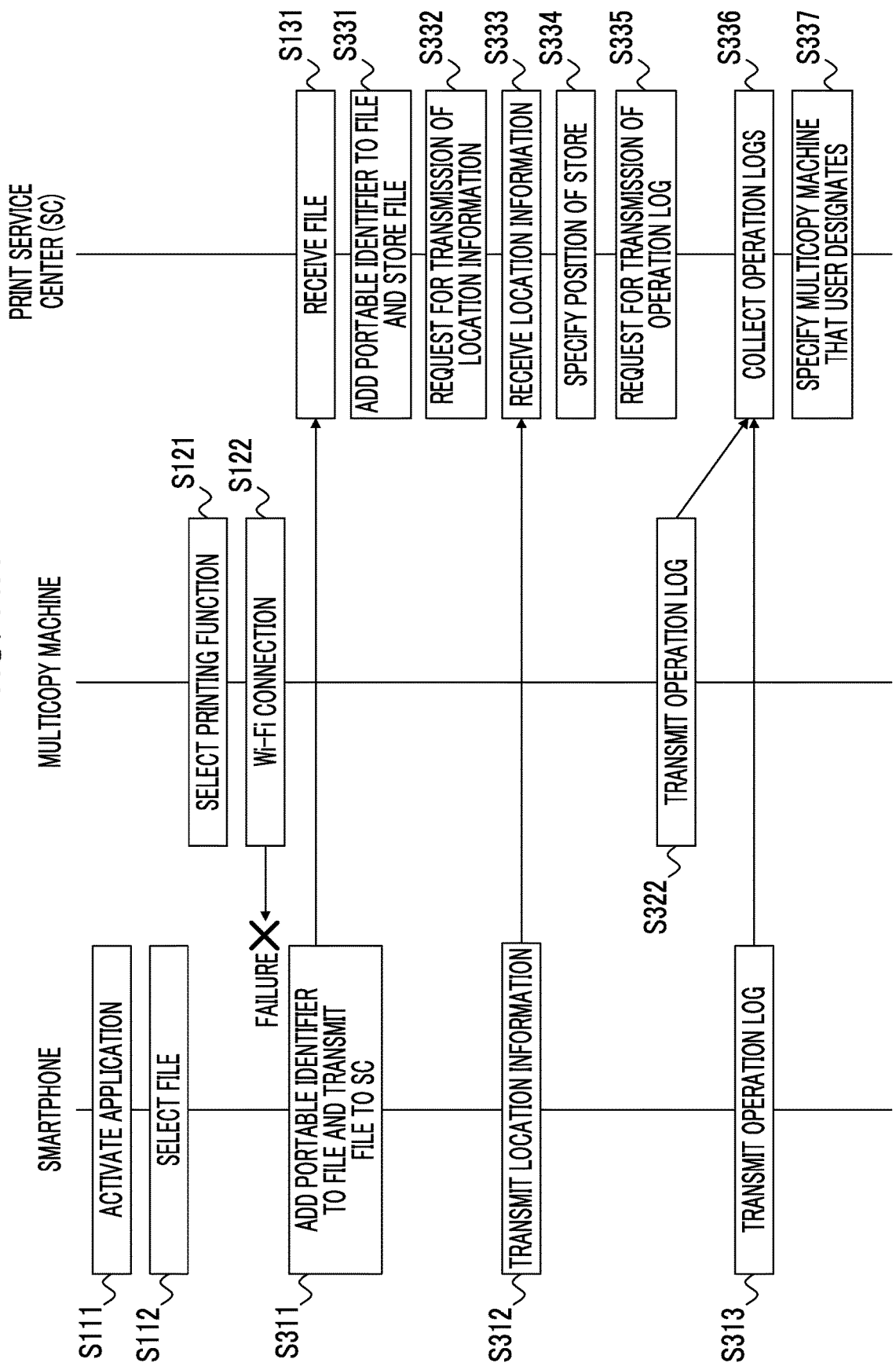
FIG. 11A is a sequence diagram showing a printing process in Exemplary Embodiment 3.

Next, the printing process according to the present exemplary embodiment will be described with reference to a sequence diagram shown in FIGS. 11A and 11B. The sequence diagram shown in FIGS. 11A and 11B corresponds to FIG. 5 in Exemplary Embodiment 1, but the identical step numbers are assigned to the processes identical to the processes in Exemplary Embodiment 1, and the description is omitted as appropriate.

The user activates the multi-copy application installed in the smartphone 30 (step S111), selects a file (step S112), and then, selects the printing function in the multicopy machine 20 (step S121), but it is assumed that the Wi-Fi connection has failed (step S122).

With the failure of the Wi-Fi connection, the file registration processing section 33 in the smartphone 30 adds the portable identifier of the smartphone 30 to the file and then transmits the file to the print service center 10 (step S311).

In a case of receiving the file transmitted from the smartphone 30 (step S131), the file reception processing section 11 in the print service center 10 adds the portable identifier, which has been added to the file, to the received file, and store the file in the file storage section 13 (step S331). Subsequently, the multicopy machine specifying section 14 requests the smartphone 30 which is the file transmission source to transmit the location information (step S332).

The location information transmission section 38 in the smartphone 30 transmits the current position measured by the GPS 306 in response to a request from the print service center 10 as location information (step S312).

In a case of receiving the location information transmitted from the smartphone 30 (step S333), the multicopy machine specifying section 14 in the print service center 10 compares the received location information with the position information of each store 1 stored in the store information storage section 16. Then, the store 1 located in a position closest to the location of the smartphone 30 is specified as the store 1 where the multicopy machine 20 that the smartphone 30 (user) designates as the instruction destination of the print instructing function is installed in the store 1 (step S334).

Incidentally, in a case where only one multicopy machine 20 is installed in the store 1, it is also possible to specify the multicopy machine 20 which is the instruction destination, by specifying the store 1. However, in a case where plural multicopy machines 20 are installed in the store 1, the print service center 10 needs to specify the multicopy machine 20 which is a file transfer destination.

Thus, the present exemplary embodiment characterized in that the operation logs recorded by the multicopy machine 20 and the smartphone 30 are effectively used. That is, the operation log collecting section 15 requests the smartphone 30 which is the file transmission source and the multicopy machine 20 installed in the specified store 1 to transmit the operation log (step S335).

In response to this transmission request, the operation log transmission section 29 in the corresponding multicopy machine 20 reads the operation log from the operation log storage section 42 and transmits the operation log to the print service center 10 (step S322). Similarly, in the smartphone 30, the operation log transmission section 40 reads the operation log from the operation log storage section 41 and transmits the operation log to the print service center 10 (step S313). Each operation log includes identification information of an apparatus which is a transmission source (portable identifier in the case of a smartphone 30).

In a case where the operation log collecting section 15 in the print service center 10 collects operation logs as described above (step S336), and stores the operation logs in the operation log storage section 17.

In a case where operation logs are collected from the corresponding multicopy machine 20 and smartphone 30, the multicopy machine specifying section 14 specifies the multicopy machine 20 that the smartphone 30 designates as the instruction destination of the print instructing function as follows (step S337).

That is, the multicopy machine specifying section 14 compares the time information recorded in the operation log collected from the smartphone 30 with the time information recorded in the operation log collected from each multicopy machine 20. Incidentally, in the smartphone 30, a Wi-Fi connection error has occurred in a case where the multi-copy application is activated by the user operation and the print instructing function is intended to be exhibited. Therefore, the multicopy machine specifying section 14 may acquire the most recently recorded operation log from the smartphone 30. On the other hand, in the multicopy machine 20, a Wi-Fi connection error occurs in a case where the printing function is selected by user operation. Therefore, the multicopy machine specifying section 14 may acquire the most recently recorded operation log from each multicopy machine 20. Then, the multicopy machine 20 compares the time information pieces as described above, and specifies the multicopy machine 20 corresponding to the date and time indicated by the time information recorded in the operation log collected from the smartphone 30 and the operation log in which the date and time of the identical time are recorded, as the multicopy machine 20 that the smartphone 30 designates as the instruction destination of the print instructing function.

As described above, the user activates the multi-copy application on the smartphone 30 and then selects the printing function in the multicopy machine 20. Since the series of operations performed by the user in the smartphone 30 and the multicopy machine 20 are performed consecutively and there is not much difference in time, in the present exemplary embodiment, the time during which these operations are performed consecutively is expressed as "the identical time".

In order to specify the multicopy machine 20 operated at the identical time to the smartphone 30, several operation logs may be collected from the most recent without being limited to the latest. Alternatively, since the user performs the operation on the smartphone 30 first, the operation log of the smartphone 30 is collected first and operation logs after the date and time indicated by the time information of the operation log may be collected from the multicopy machine 20.

In a case where the multicopy machine 20 that the user operates as described above is specified, the file transmission processing section 12 reads the file associated with the portable identifier included in the operation log of the smartphone from the file storage section 13 (step S338), and transmits the file to the multicopy machine 20 which is the transmission request source (step S137).

Since the process executed after the multicopy machine 20 receives the file from the print service center 10 is identical to the process in Exemplary Embodiment 1, the description thereof will be omitted.

In the present exemplary embodiment, even in a case where plural multicopy machines 20 are installed atone store 1, the multicopy machine 20 operated by the user is specified, and it is possible to transfer the file from the smartphone 30 to the specified multicopy machine 20.

In a case where only one multicopy machine 20 is installed in the store 1, there is no need to execute the process of specifying the multicopy machine 20 by using the operation log. However, a process may be executed to verify whether or not a series of operations has been performed between the smartphone 30 and the multicopy machine 20 by the operation log.

Incidentally, in a case where any failure occurs, including a Wi-Fi connection error, the multicopy machine 20 transmits failure information to a failure management center (not shown) to report a failure. In each of the exemplary embodiments described above, the smartphone 30 searches for the access point 208 in the multicopy machine 20, waits until a Wi-Fi connection with the multicopy machine 20 fails, and then transmits the file to the print service center 10. However, the print control section 35 may determine whether to make a Wi-Fi connection with the multicopy machine 20 before attempting a Wi-Fi connection with the multicopy machine 20. For example, the print control section 35 acquires failure information of communication with the multicopy machines 20 by making an inquiry to the failure management center before attempting a Wi-Fi connection with the multicopy machine 20. The state of the Wi-Fi connection with the multicopy machine 20 may be acquired from the failure information, and the availability of the print instructing function may be estimated from the acquired state of the multicopy machine 20. Here, for example, in a case where the Wi-Fi connection error has occurred in the multicopy machine 20 within a predetermined period over a threshold number of times, the print control section 35 estimates that there is an abnormality in the access point 208 in the multicopy machine 20, and processes the file to be immediately transmitted to the print service center 10 without Wi-Fi connection with the multicopy machine 20. On the other hand, in the case where the number of occurrences of the Wi-Fi connection error within the predetermined period in the multicopy machine 20 has not reached the threshold, the print control section 35 attempts the Wi-Fi connection with the multicopy machine 20 as each of the exemplary embodiments described above.

In addition, in order to associate the smartphone 30 with the multicopy machine 20, in Exemplary Embodiments 1, 2, the registration number and the portable identifier are described as examples of information input from the smartphone 30 side to the multicopy machine 20 side, but other types of information may be used. For example, the information may be any alphanumeric text string generated by the user.

Figure 12:
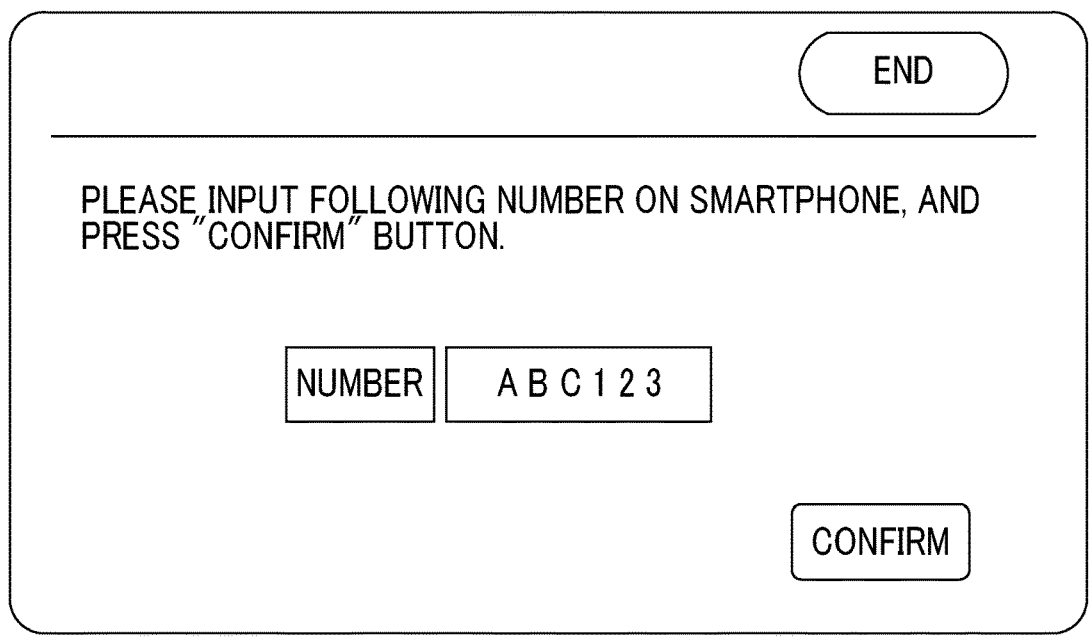
FIG. 12 is a diagram showing an example of a display screen for displaying a text code to be input by a user from a smartphone.
Figure 13:
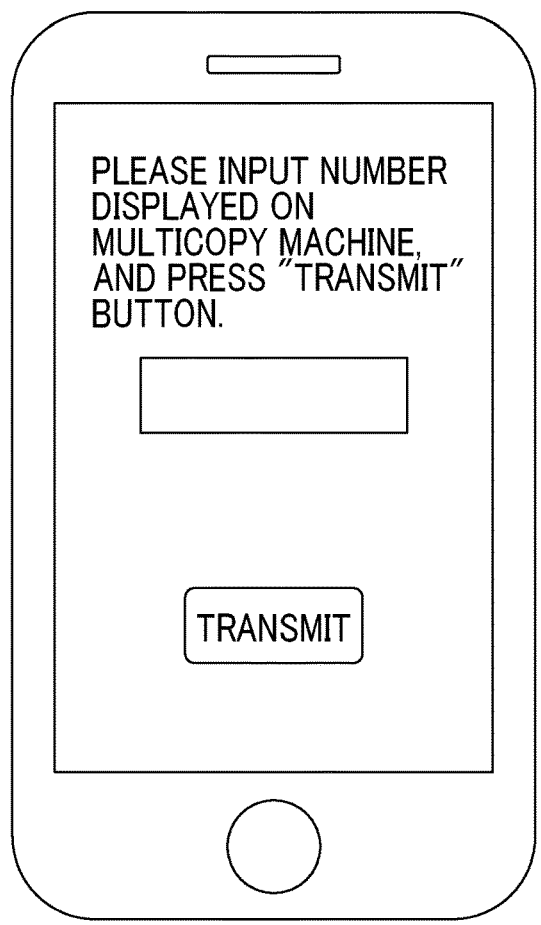
FIG. 13 is a diagram showing an example of a text code input screen.

Alternatively, contrary to Exemplary Embodiments 1, 2, information relating to the multicopy machine 20 may be input by the smartphone 30. For example, in a case where a Wi-Fi connection error occurs, the print control section 25 instructs the user interface section 22 to display the text code to be input by the smartphone 30 on the operation panel 207 in the multicopy machine 20, as illustrated in FIG. 12. In a case of detecting a Wi-Fi connection error, the print control section 25 in the smartphone 30 instructs the user interface section 32 to display the input screen shown in FIG. 13 on the liquid crystal panel 305 and makes the user input the text code displayed on the operation panel 207. The multicopy machine 20 transmits the displayed text code to the print service center 10, and the smartphone 30 transmits the input text code to the print service center 10. The print service center 10 associates the smartphone 30 with the multicopy machine 20 according to the text codes transmitted respectively from the multicopy machine 20 and the smartphone 30.

The text code may be an alphanumeric text string generated by the multicopy machine 20 or an error code indicating a Wi-Fi connection error. Alternatively, the text code may be the machine number of the multicopy machine 20 or the date and time.

In the above description, the case where the multicopy machine 20, which is an example of the information processing apparatus, is caused to execute the printing process has been described as an example, but the printing process is an example of processes executed by the information processing apparatus, and it is not necessary to limit the process to the printing process as long as a process can be executed by the information processing apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A file processing system comprising:
an information processing apparatus;
a terminal apparatus that has a process instructing function for directly transmitting a file to be processed to the information processing apparatus and executing a process, by a user; and
a server that is connected to the terminal apparatus and the information processing apparatus through a network,
wherein the terminal apparatus includes a first processor configured to transmit a file to the server, in a case where the process instructing function is not capable of being used due to a failure of communication with the information processing apparatuses,
wherein the file processing system further comprises a second processor is configured to control transfer of the file transmitted to the server, to the information processing apparatus, and
wherein the information processing apparatus includes a third processor is configured to control a process of the file acquired from the terminal apparatus through the server, in a case where the process instructing function is not capable of being used due to the failure of communication with the information processing apparatuses.

2. The file processing system according to claim 1,
wherein the server associates specific information for specifying the file received from the terminal apparatus with the file, and
wherein in the information processing apparatus, the second processor is configured to transmit to the server, a transmission request including the specific information acquired from the terminal apparatus or the specific information received by a user operation on the terminal apparatus to acquire the file associated with the specific information.

3. The file processing system according to claim 2,
wherein the server includes a registration number transmitting unit that in a case of receiving the file from the terminal apparatus, issues a registration number of a process as the specific information of the file, associates the registration number with the file, and transmits the registration number to the terminal apparatus,
wherein the information processing apparatus further includes a receiving unit that receives a registration number input by the user of the terminal apparatus, and
wherein in the information processing apparatus, the second processor is configured to transmit to the server, a transmission request including the registration number received by the receiving unit to acquire the file associated with the registration number.

4. The file processing system according to claim 2,
wherein in a case of receiving the file from the terminal apparatus, the server associates the file with apparatus identification information of the terminal apparatus acquired by inquiring of the terminal apparatus as identification information of the file,
wherein the information processing apparatus further includes an apparatus identification information acquiring unit that acquires the apparatus identification information of the terminal apparatus from the terminal apparatus, and
wherein in the information processing apparatus, the second processor is configured to transmit to the server, a transmission request including the apparatus identification information acquired by the apparatus identification information acquiring unit to acquire the file associated with the apparatus identification information.

5. The file processing system according to claim 4,
wherein the apparatus identification information acquiring unit acquires the apparatus identification information of the terminal apparatus by performing short-distance wireless communication with the terminal apparatus that is brought closer by the user.

6. The file processing system according to claim 1,
wherein a plurality of the information processing apparatuses are provided,
wherein the first processor is further configured to record terminal apparatus-side operation log information on a user operation related to the process instructing function,
wherein each of the third processor is configured to record information processing apparatus-side operation log information on a user operation related to a processing execution function cooperating with the process instructing function, in a case where the information processing apparatus is designated as a processing instruction destination of the process instructing function by the terminal apparatus, wherein the second processor is further configured to:
acquire position information of the plurality of information processing apparatuses,
acquire location information of the terminal apparatus in a case of receiving a file from the terminal apparatus, and
specify an information processing apparatus which is a processing instruction destination designated by the terminal apparatus, from among the plurality of information processing apparatuses, by comparing the location information with the position information of the plurality of information processing apparatuses and analyzing the terminal apparatus-side operation log information and the information processing apparatus-side operation log information, and wherein in the server, the second processor is configured to transmit a file to the specified information processing apparatus, in a case where the information processing apparatus is specified by the second processor.

7. The file processing system according to claim 6,
wherein the second processor is configured to specify an information processing apparatus closest to the terminal apparatus from the location information and the position information of the plurality of information processing apparatuses as the information processing apparatus which is designated as the processing instruction destination by the terminal apparatus.

8. The file processing system according to claim 7,
wherein the second processor is configured to specify an information processing apparatus for which the information processing apparatus-side operation log information at the identical time to the most recently recorded the terminal apparatus-side operation log information is recorded, as the information processing apparatus which is designated as the processing instruction destination by the terminal apparatus.

9. The file processing system according to claim 6,
wherein in a case where a plurality of the information processing apparatuses capable of communicating with the terminal apparatus based on the location information and the position information of the plurality of information processing apparatuses are provided, the second processor is configured to specify an information processing apparatus for which the information processing apparatus-side operation log information at the identical time to the most recently recorded the terminal apparatus-side operation log information is recorded, as the information processing apparatus which is designated as the processing instruction destination by the terminal apparatus.

10. The file processing system according to claim 1,
wherein the terminal apparatus includes an estimating unit that acquires failure information of communication with the information processing apparatus before attempting to connect to the information processing apparatus, and estimates availability of the process instructing function from the acquired failure information.

11. A file processing system comprising:
an information processing apparatus;
a terminal apparatus that has a process instructing function for directly transmitting a file to be processed to the information processing apparatus and executing a process, by a user; and
a server that is connected to the terminal apparatus and the information processing apparatus through a network,
wherein the terminal apparatus includes a first processor for transmitting a file to the server, in a case where the process instructing function is not capable of being used due to a failure of communication with the information processing apparatuses,
wherein the file processing system further comprises a second processor for controlling transfer of the file transmitted to the server, to the information processing apparatus, and
wherein the information processing apparatus includes a third processor for controlling a process of the file acquired from the terminal apparatus through the server, in a case where the process instructing function is not capable of being used due to the failure of communication with the information processing apparatuses.

* * * * *